United States Patent
Lagares-Greenblatt et al.

(10) Patent No.: US 10,203,678 B2
(45) Date of Patent: Feb. 12, 2019

(54) FOOD FRESHNESS MANAGEMENT

(71) Applicant: International Business Machines Corporation, Armonk, NY (US)

(72) Inventors: Heidi Lagares-Greenblatt, Jefferson Hills, PA (US); Jenny S. Li, Cary, NC (US); Pamela A. Nesbitt, Ridgefield, CT (US); Xinlin Wang, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/700,079

(22) Filed: Sep. 9, 2017

(65) Prior Publication Data

US 2018/0196403 A1    Jul. 12, 2018

Related U.S. Application Data

(63) Continuation of application No. 15/401,001, filed on Jan. 7, 2017.

(51) Int. Cl.
```
G05B 19/048      (2006.01)
A23L 3/00        (2006.01)
F25D 29/00       (2006.01)
```
(52) U.S. Cl.
CPC ............ *G05B 19/048* (2013.01); *A23L 3/003* (2013.01); *F25D 29/00* (2013.01); *A23V 2002/00* (2013.01); *F25D 2500/06* (2013.01); *G05B 2219/2654* (2013.01)

(58) Field of Classification Search
CPC .......... G05B 19/048; G05B 2219/2654; A23V 2002/00; F25D 2500/06
See application file for complete search history.

(56) References Cited

U.S. PATENT DOCUMENTS

| 7,196,625 B1 | 3/2007 | Nguyen |
| 9,449,208 B2 | 9/2016 | Luk et al. |
| 2007/0172910 A1 | 7/2007 | Nolen |

(Continued)

FOREIGN PATENT DOCUMENTS

| CN | 102706093 A | 10/2012 |
| CN | 101986069 B | 1/2013 |

(Continued)

OTHER PUBLICATIONS

IBM: List of IBM Patents or Patent Applications Treated As Related (Appendix P), Sep. 9, 2017, pp. 1-2.

(Continued)

*Primary Examiner* — Mark A Connolly
(74) *Attorney, Agent, or Firm* — Kristofer L. Haggerty

(57) ABSTRACT

Disclosed aspects relate to food freshness management. A freshness triggering event may be identified for a food item. The freshness triggering event may indicate that a criterion related to the food item has been achieved. A food freshness management action may be determined. The food freshness management action may be determined to respond to the freshness triggering event for the food item. The food freshness management action may be initiated. The food freshness management action may be carried-out with respect to the freshness triggering event for the food item.

1 Claim, 6 Drawing Sheets

(56) References Cited

U.S. PATENT DOCUMENTS

| | | | | |
|---|---|---|---|---|
| 2007/0235528 A1* | 10/2007 | Spencer | ............... | G06Q 10/087 235/383 |
| 2008/0250797 A1* | 10/2008 | Rozendaal | .............. | F25D 29/00 62/127 |
| 2010/0148958 A1* | 6/2010 | Chen | ....................... | G04F 1/005 340/540 |
| 2015/0002299 A1 | 1/2015 | Sandvick | | |
| 2016/0300285 A1* | 10/2016 | Gandhi | .............. | G06Q 30/0623 |
| 2017/0039511 A1 | 2/2017 | Corona et al. | | |
| 2017/0236390 A1* | 8/2017 | Herschkowitz | ....... | H04W 76/10 340/539.12 |
| 2018/0133583 A1* | 5/2018 | Tran | ....................... | A63B 69/38 |

FOREIGN PATENT DOCUMENTS

| | | |
|---|---|---|
| CN | 202993745 U | 6/2013 |
| CN | 204648818 U | 9/2015 |
| WO | 2014016212 A1 | 1/2014 |
| WO | 2017059480 A1 | 4/2017 |

OTHER PUBLICATIONS

Colon, Alex; "Got Milk? The Smarter Fridge Cam Will Show You"; PC Magazine; <http://www.pcmag.com/article2/0,2817,2497459,00.asp>; Jan. 5, 2016.

IP.com; "System and Method for Real Time Cold Chain Distribution Optimization"; Sep. 6, 2011.

IP.com; "System and Method to optimize food freshness in a refrigerator/freezer"; May 14, 2012.

Gorbunova et al.; "Research of principles for estimating the freshness of meat products by color analysis method"; ITMO University; Mar. 13, 2015.

Lagares-Greenblatt et al., Pending U.S. Appl. No. 15/401,001, filed Jan. 7, 2017, titled "Food Freshness Management," , pp. 1-65.

* cited by examiner

FOOD FRESHNESS MANAGEMENT

BACKGROUND

This disclosure relates generally to computer systems and, more particularly, relates to food freshness management. The amount of food storage devices used by society is increasing. As the amount of food storage devices used increases, the need food freshness management may also increase.

SUMMARY

Aspects of the disclosure relate to food storage and food freshness management in a food storage device. Features may notify users when a food item is spoiled or almost spoiled through use of freshness indicators inside the refrigerator or other food storage device. Disclosed aspects may use sensors and visual display indicators inside the food storage device to provide the visual effect. In various embodiments, features may use a variation of colors in order to inform the user of a food item that has expired or is close to expiring. In embodiments, the user may have control of the data and choose to override it. In certain embodiments, features may be connected to other services (e.g., barcode scan applications, shopping services) to collect information about the items in the food storage device. In various embodiments, the food storage device may be arranged to include specific areas for specific items. In certain embodiments, the food storage device may take an inventory of the food item content stored inside.

Disclosed aspects relate to food freshness management. A freshness triggering event may be identified for a food item. The freshness triggering event may indicate that a criterion related to the food item has been achieved. A food freshness management action may be determined. The food freshness management action may be determined to respond to the freshness triggering event for the food item. The food freshness management action may be initiated. The food freshness management action may be carried-out with respect to the freshness triggering event for the food item.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
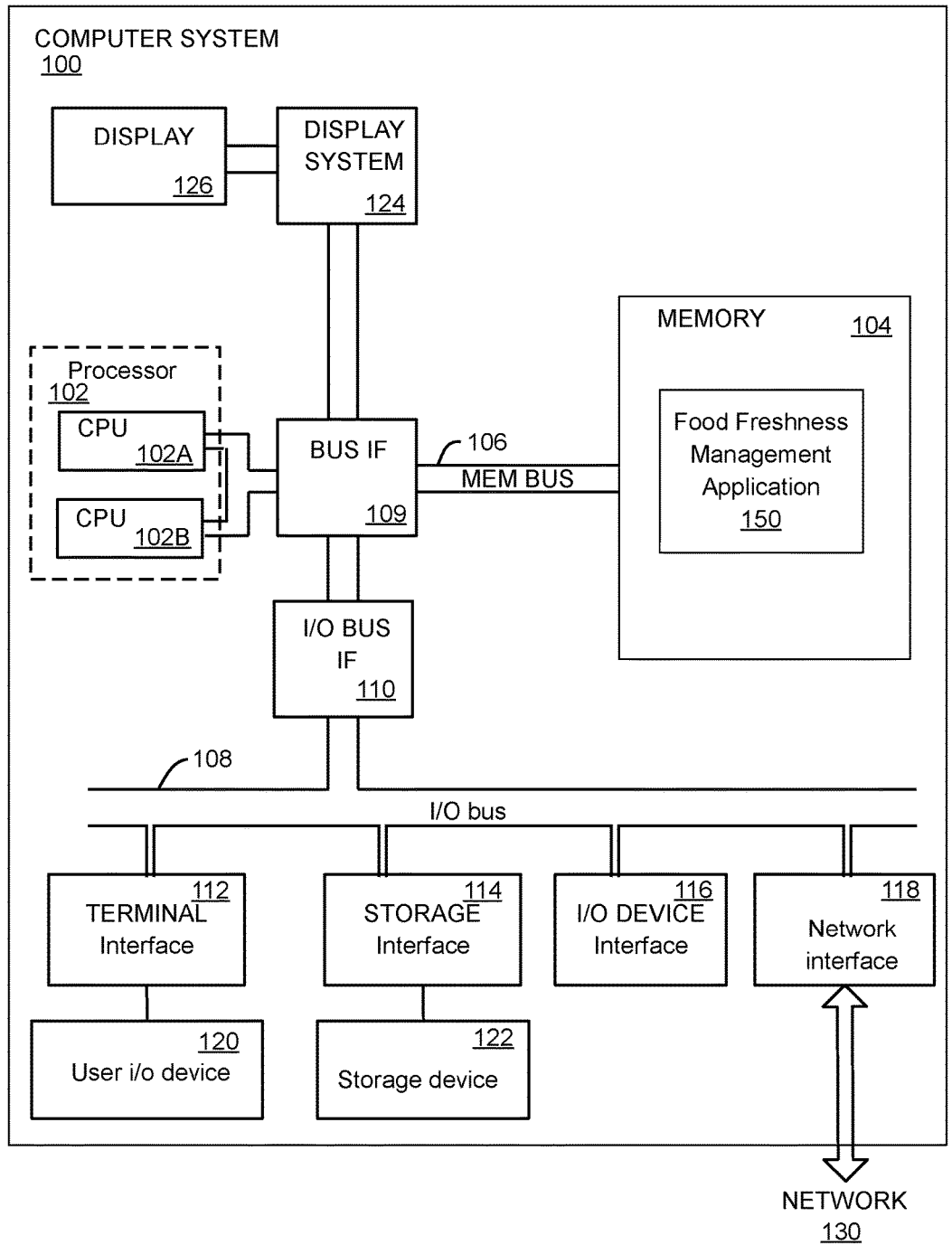
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to food storage and food freshness management in a food storage device. Features may detect a change in nature of a food item related to freshness. Disclosed aspects may determine an action to respond to the change in nature of the food item. Aspects of the disclosure may initiate the food freshness management action by sending a command to a sensory-oriented component of a food storage device. Disclosed aspects may carry-out the food freshness management action through providing the user with visual or audio aids to indicate a level of freshness of a food item.

Many people use food storage devices such as refrigerators, freezers, and coolers in everyday life. A user may forget about food items in a food storage device and may end up eating these food items after they have expired. A user may also have difficulty finding certain food items in their food storage devices, or forget to purchase food items and run out of them. A food storage management system may solve many food-related problems that users face with their food storage devices. The food storage management system may track the food in a food storage device and create visual aids, such as colors in storage locations, so the user can locate food items with ease. The visual aids may provide a freshness indicator for food items and locations, such as shelves or compartments, in a food storage device. The food storage management system may also detect items that may lose quality if removed from the storage device for a certain time period. The food storage management system may provide the user with an alert if these food items are removed from the food storage device for a certain established temporal period.

Aspects of the disclosure include a system, method, and computer program product of food freshness management. A freshness triggering event may be identified for a food item. The freshness triggering event may indicate that a criterion related to the food item has been achieved. A food freshness management action may be determined. The food freshness management action may be determined to respond to the freshness triggering event for the food item. The food freshness management action may be initiated. The food freshness management action may be carried-out with respect to the freshness triggering event for the food item.

In embodiments, features may provide the user with a visual or audio indicator of a freshness factor. In certain embodiments, the visual indicator may be configured to include a color. In embodiments, disclosed aspects may acquire a set of food item data or shopping data for the food item. In embodiments, aspects of the disclosure may construct the food storage device to include a set of sensors. In various embodiments, features may connect the set of sensors with the food freshness management engine. In certain embodiments, a freshness triggering event for the food item may be sensed by the food freshness management engine. In embodiments, features may also take inventory of the food items being stored inside. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory. As an example, processing time may be saved through the use of sensory-oriented components instead of text message or email alerts. For example, the use of a flashing light to indicate the expiration of a food item may require less processing time than alerting the user of the expiration of a food item via text message. Other methods of saving processing time through food freshness management may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a food freshness management application 150. In embodiments, the food freshness management application 150 may include instructions or statements that execute on the processor 102 or instructions or statements that are interpreted by instructions or statements that execute on the processor 102 to carry out the functions as further described below. In certain embodiments, the food freshness management application 150 is implemented in hardware via semiconductor devices, chips, logical gates, circuits, circuit cards, and/or other physical hardware devices in lieu of, or in addition to, a processor-based system. In embodiments, the food freshness management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other 110 devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
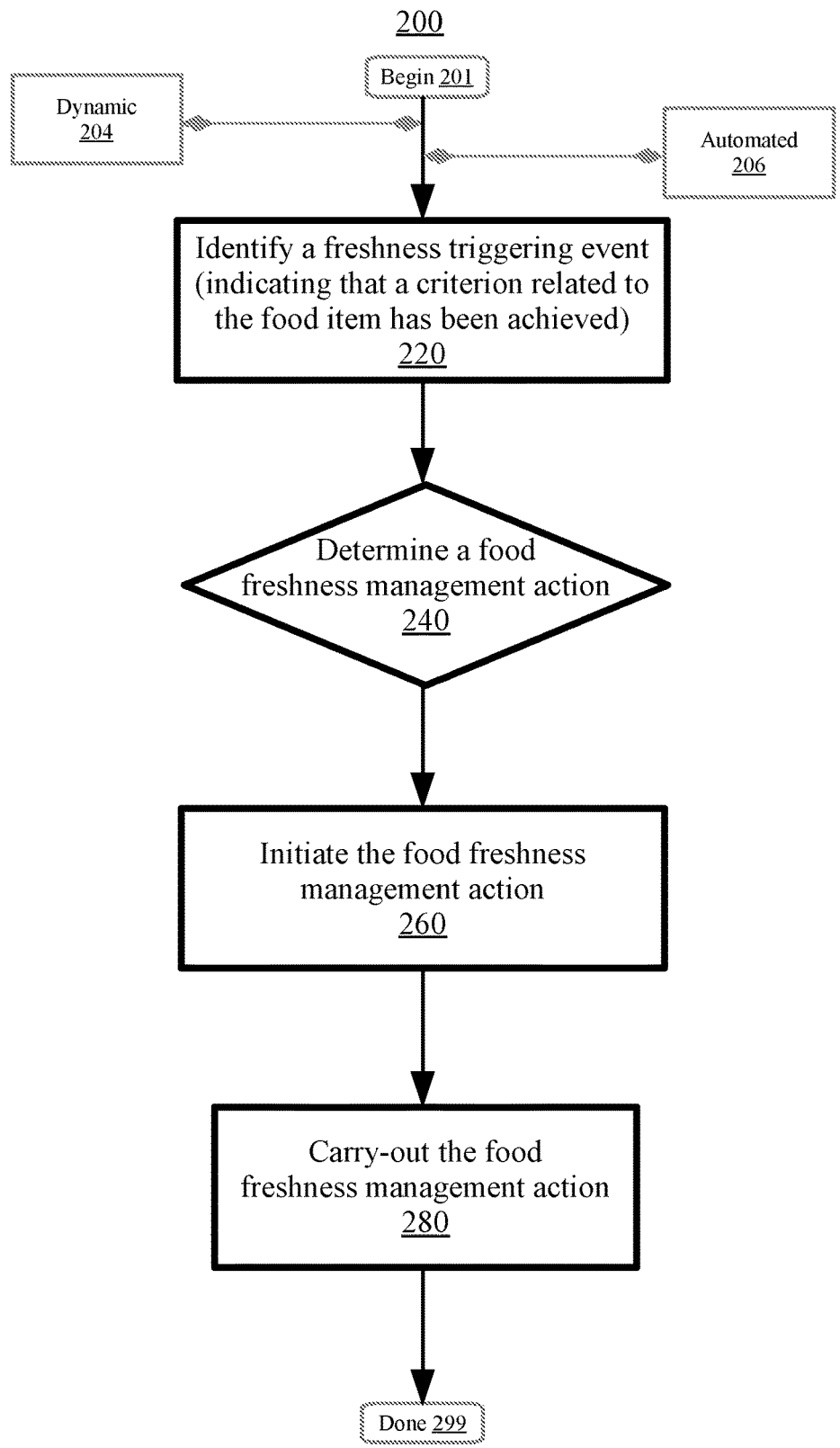
FIG. 2 is a flowchart illustrating a method of food freshness management using a food storage device which has a food freshness management engine, according to embodiments.

FIG. 2 is a flowchart illustrating a method 200 of food freshness management using a food storage device which has a food freshness management engine. The method 200 may begin at block 201. In embodiments, the identifying, the determining, the initiating, the carrying-out, and the other steps described herein may each be executed in a dynamic fashion at block 204. The identifying, the determining, the initiating, the carrying-out, and the other steps described herein may be executed in a dynamic fashion to streamline food freshness management. The identifying, the determining, the initiating, the carrying-out, and the other steps described herein may be performed simultaneously (e.g., the freshness triggering event of a food item may be identified in real-time as the user deposits and removes food items from the food storage device) in order to streamline (e.g., facilitate, promote, enhance) food freshness management. Other methods of performing the steps described herein are also possible. In embodiments, the identifying, the determining, the initiating, the carrying-out, and the other steps described herein may each be executed in an automated fashion at block 206. The identifying, the determining, the initiating, the carrying-out, and the other steps described herein may be executed in an automated fashion without user intervention. In embodiments, the identifying, the determining, the initiating, the carrying-out, and the other steps described herein may be carried out by an internal food freshness management module maintained in a persistent storage device of a local computing device. In certain embodiments, the identifying, the determining, the initiating, the carrying-out, and the other steps described herein may be carried out by an external food freshness management module hosted by a remote computing device or server. In this way, aspects of food freshness management may be performed using automated computer machinery without manual action. Other methods of performing the steps described herein are also possible.

At block 220, a freshness triggering event may be identified for a food item. Identifying may include ascertaining, observing, resolving, or otherwise determining a freshness triggering event for a food item (e.g., food, drink, packaging of such). The freshness triggering event may indicate a change in freshness status for the food item (e.g., removal of the food item from the food storage device, deposit of the food item in the food storage device, change in quantity of the food item, length of time during which the food item has remained in the food storage device). The freshness triggering event may be identified using sensors, cameras, or the like as part of the food storage device (e.g., refrigerator, freezer). The freshness triggering event may be identified by the food freshness management engine of the food storage device. The freshness triggering event may indicate (e.g., signal, specify) that a criterion related to the food item has been achieved (e.g., a food freshness event, a new freshness status for the food item). A criterion may be a benchmark or predetermined time period, temperature, amount, or other value related to the food item (e.g., time period during which the food item was outside of the food storage device, temperature of the food item, amount remaining of the food item). The achievement of the criterion may include reaching or exceeding the predetermined benchmark value of time, temperature, amount, or the like. Once the criterion has been reached or exceeded, a food freshness management action may be determined.

Consider the following example. A user may buy a gallon of milk and store the gallon of milk in their food storage device (e.g., refrigerator) which has a food freshness management engine. The refrigerator may indicate that the typical gallon of milk will take a temporal period of ten days to expire. The gallon of milk may have been in the refrigerator for eleven days. The refrigerator may identify a freshness triggering event (e.g., passing of a length of time of eleven days) for the gallon of milk. The freshness triggering event may indicate that a criterion related to the food item has been achieved. In this case, the freshness triggering event may indicate that the gallon of milk may be expired based on the temporal period of ten days that a gallon of milk typically takes to expire and the achievement of the eleventh day since the gallon of milk was purchased. It may be determined that the length of eleven days exceeds the temporal period of ten days after which the milk may be expected to expire. Since the criterion (e.g., exceeding of the temporal period of ten days) has been achieved, a freshness triggering event (e.g., the milk is expired) may be identified for the food item (e.g., gallon of milk). Other methods of identifying a freshness triggering event for a food item may also occur.

At block 240, a food freshness management action may be determined by the food freshness management engine of the food storage device. Generally, determining can include identifying, computing, resolving, selecting, formulating, or otherwise ascertaining a food freshness management action. The food freshness management action may be a process or operation that may alert the user of a food freshness event. The food freshness management action may signify to the user the occurrence of a freshness triggering event for a food item through various types or combinations of types of alerts (e.g., sound, visual). The food freshness management action may be determined to respond to the freshness triggering event for the food item (e.g., a response based on a nature of the freshness triggering event and the food item). The food freshness management action may be formulated to alert the user of a nature or a change in a nature of a food item. As an example, a food item may be expired. The determined food freshness management action may include alerting the user of the expiration of the food item. Other methods of determining a food freshness management action may also be possible.

Consider the following example. A user may remove a pint of ice cream from their freezer and leave the pint on the kitchen table for twenty minutes while eating a bowl of the ice cream. The freshness of the ice cream may decrease after being left at room temperature for twenty minutes. The user may return the pint of ice cream to the freezer. The freezer may identify that the freshness of the ice cream has decreased due to the low temperature (e.g., room temperature) of the ice cream, the passing of time since the ice cream was removed from the freezer (e.g., twenty minutes), and the decrease in quantity of the ice cream in the container. The food freshness management engine of the freezer may determine a food freshness management action to respond to the decrease in freshness of the pint of ice cream. The food freshness management action may include alerting the user about the decrease in freshness of the pint of ice cream through various sensory alerts. The user may also be planning to serve the remainder of this ice cream to guests at their house. While the ice cream was left on the kitchen table for twenty minutes, it may have melted, which may lower the quality of the ice cream even after it has been returned to the freezer. The food storage device (e.g., freezer) may detect the change in nature of the ice cream (e.g., melted, lower quality). The food storage device may determine that the user should be provided with an indicator to buy more ice cream to serve to their guests based on the change in nature of the food item. Other methods of determining a food freshness management action may also be possible.

At block 260, the food freshness management action may be initiated by the food freshness management engine of the food storage device. Initiating can include instituting, launching, starting, instantiating, or otherwise commencing the food freshness management action (e.g., sending a command, sending an alert). The food freshness management action may utilize (e.g., implement, deploy) a sensory-oriented component of the food storage device. The sensory-oriented components may include a noisemaker, a light, or other types of sensory alert devices. The food storage device may send a command or alert in order to initiate the food freshness management action. The sensory-oriented components may be implemented to carry-out the food freshness management action to alert the user of a nature of a food item. The sensory-oriented components may be configured such that the user will be alerted of the freshness triggering event when the food storage device is next used (e.g., use of a noisemaker when the user opens the freezer door, flashing a light when the user opens the refrigerator door).

Consider the following example. A user may remove a jar of salsa from their refrigerator. The jar of salsa may be removed from the refrigerator for a period of ten minutes while the user eats a snack. The user may not put the lid all the way back on the jar when they return the jar to the refrigerator after ten minutes. The freshness triggering event for the jar of salsa may be identified (e.g., the jar was removed from the refrigerator for a period of ten minutes, the jar was not completely sealed). A food freshness management action may be determined by the food freshness management engine of the refrigerator. The food freshness management action may include alerting the user of the decrease in freshness of the salsa as well as the continual decrease in freshness of the salsa while the lid is slightly open. The food freshness management action may be initiated by the food freshness management engine of the refrigerator. A command may be sent by the food freshness management engine of the refrigerator to provide the user with an alert which indicates the change in freshness of the salsa. The alert may include utilizing a noisemaker, a flashing light near the jar of salsa, or other types of alerts indicating that the container is not sealed. The sensory-oriented components may be initiated to be carried-out when the user opens the food storage device (e.g., refrigerator). Other methods of initiating the food fitness management action may also occur.

At block 280, the food freshness management action may be carried-out by the sensory-oriented component of the food storage device. Carrying-out may include executing, implementing, or otherwise performing the sensory-oriented component (e.g., audio alert, visual alert) of the food storage device. The food freshness management action may be carried-out with respect to the freshness triggering event for the food item. The nature or change in nature of a food item may result in the carrying-out of the food freshness management action in order to alert the user of this nature or change in nature. The food freshness management action may be carried-out such that the sensory-oriented component of the food storage device is prepared for the next time the food storage device is in use (e.g., configuring a light such that it will flash when the user opens the refrigerator door). The user may be capable of sensing the nature or change in nature of the food item as a result of the carrying-out of the food freshness management action through the utilization of the sensory-oriented components.

Consider the following example. A user may have a loaf of bread in their refrigerator that is beginning to mold. A freshness triggering event for the loaf of bread may be identified (e.g., existence of mold, change in color, change in odor). The existence of mold on the loaf of bread may trigger the determination of a food freshness management action to alert the user that the bread has expired and should not be eaten. The food freshness management action may include the refrigerator notifying the user through an audio message (e.g., "The bread on the top shelf is moldy"). The food freshness management action may be initiated. The food freshness management engine may send a command to the noisemaker indicating that the refrigerator needs to notify the user that the bread is moldy via audio message. The food freshness management action may be carried-out by the sensory-oriented component of the refrigerator. The food freshness management action may be configured such that the noisemaker may notify the user as soon as the refrigerator door has been opened. In this case, when the user opens the refrigerator, the refrigerator may send an audio message, "The bread on the top shelf is moldy." The food freshness management action may indicate to the user that the bread needs to be thrown out. Other examples of carrying-out the food freshness management action may also be possible.

Method 200 concludes at block 299. As described herein, aspects of method 200 may be related to using data of a food item in order to manage the freshness of a food item. Aspects of method 200 may provide performance or efficiency benefits for improving the freshness of a food item using a food storage device which has a food freshness management engine. Aspects may save resources such as bandwidth, disk, processing, or memory. As an example, aspects may save bandwidth through the use of sensory-oriented alerts instead of text message alerts to the user. The use of sensory-oriented alerts (e.g., audio message from the freezer, flashing light in the refrigerator) to indicate the expiration of a food item instead of a text message alert may save bandwidth.

The sensory-oriented alerts may not require the use of a network and therefore may save bandwidth. Other methods of saving bandwidth through food freshness management may also be possible.

Figure 3:
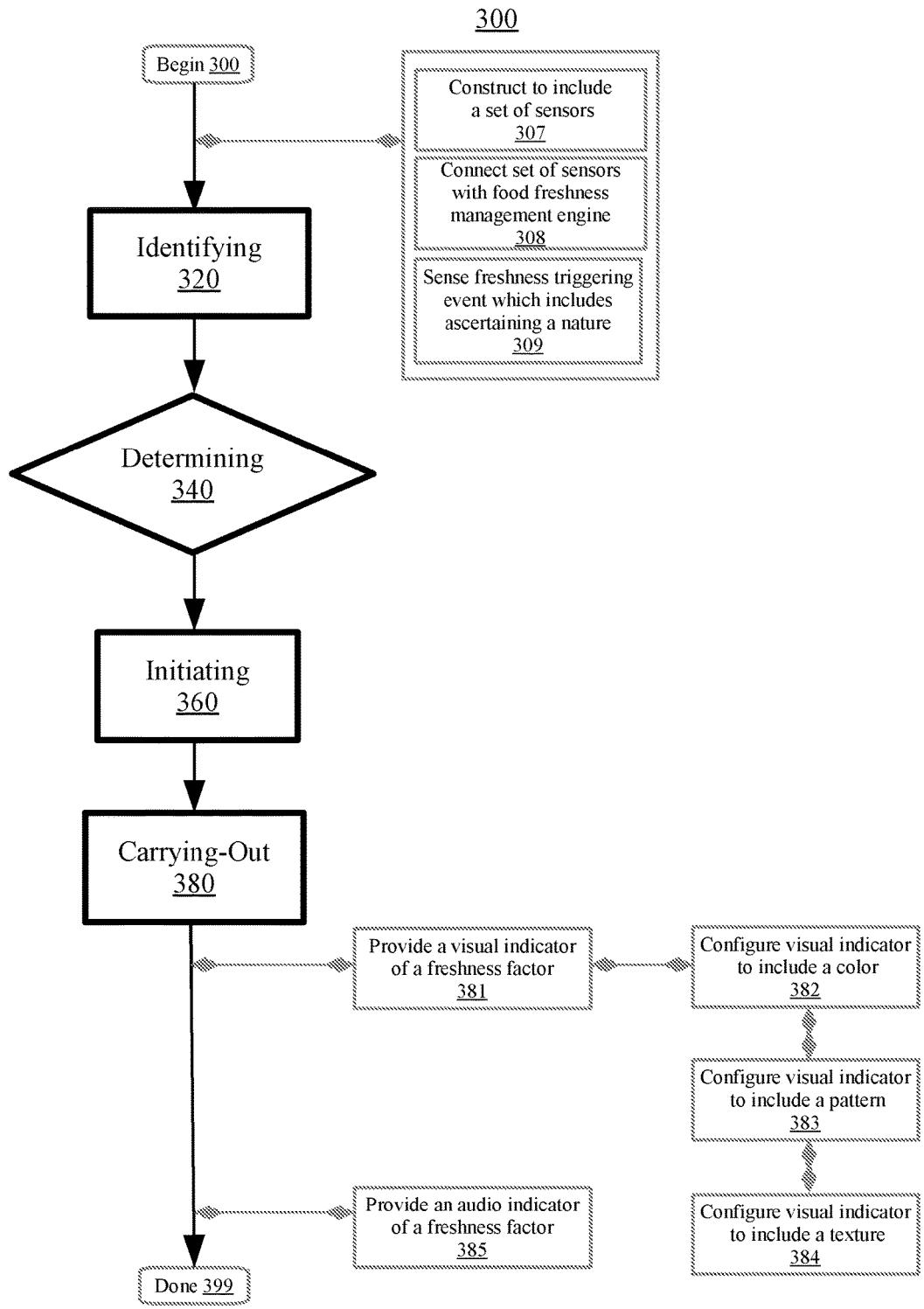
FIG. 3 is a flowchart illustrating a method of food freshness management using a food storage device which has a food freshness management engine, according to embodiments.

FIG. 3 is a flowchart illustrating a method 300 of food freshness management using a food storage device which has a food freshness management engine, according to embodiments. Aspects of method 300 may be similar or the same as aspects of method 200, and aspects may be utilized interchangeably with one or more methodologies described herein. The method 300 may begin at block 301.

In embodiments, the food storage device may be constructed to include a set of sensors at block 307. Generally, constructing can include configuring, creating, composing, assembling, or otherwise organizing the food storage device to include a set of sensors. The set of sensors may include detection devices (e.g., still image cameras, video image cameras, bar code scanners, sensitive smell detection devices). The food storage device (e.g., refrigerator, freezer, cooler, lunchbox, industrial refrigerator, meat locker) may be configured such that a set of sensors is present. The set of sensors may enable the food storage device to keep track of, monitor, observe information about, or derive conclusions from the food items as well as the nature or change in the nature of these food items. In embodiments, the set of sensors may be connected with the food freshness management engine at block 308. Connecting may include attaching, coupling, combining, linking, or otherwise joining the set of sensors with the food freshness management engine. The connection can include a communicative linkage such as a Wifi connection, a hardwire Ethernet connection, various wiring systems, or the like. The connection of the set of sensors with the food freshness management engine may enable the data recorded by the set of sensors to be used by the food freshness management engine to initiate food freshness management for a food item or group of food items.

In embodiments, the freshness triggering event for the food item may be sensed at block 309. Sensing may include discerning, detecting, identifying, or otherwise ascertaining the freshness triggering event for the food item. The freshness triggering event for the food item may be sensed by the food freshness management engine using the set of sensors (e.g., still image cameras, video image cameras, bar code scanners, sensitive smell detection devices). The connecting of the set of sensors with the food freshness management engine may allow the freshness triggering event for the food item to be sensed. The sensing may occur through a measurement of weight of a food item, a comparison of still images of the same food item at different times, a measurement of the level of a food item in a container, a video image of a food item being removed from the food storage device, or other methods of sensing a freshness triggering event. The food freshness management engine may use data collected from the set of sensors to monitor food items for a freshness triggering event. The set of sensors may sense the freshness triggering event in advance of identifying the nature of the freshness triggering event (e.g., sensing a gallon of milk has been deposited in the refrigerator before identifying the level of freshness of the gallon of milk). The identifying of the freshness triggering event for the food item may include ascertaining a nature of the freshness triggering event for the food item. Ascertaining may include determining, establishing, or otherwise discovering a nature of the freshness triggering event for the food item. The nature of the freshness triggering event for the food item may include expired, about to expire, a low quantity, an unhealthy appearance, or other natures. The set of sensors may first sense the freshness triggering event (e.g., removal of a food item, deposit of a food item, change in quantity of a food item) before ascertaining the nature of the freshness triggering event (e.g., milk is about to expire, the user is almost out of butter). The constructing and connecting of the set of sensors with the food freshness management engine and the sensing of the freshness triggering event before ascertaining a nature of the freshness triggering event may allow the food storage device to alert the user of food items that may need to be replaced.

Consider the following example. The refrigerator of a user may be constructed to include a set of still image cameras. The user may be using their refrigerator to store a bag of spinach. The bag of spinach may have an expiration date printed on the packaging, such as November 15. The set of still image cameras inside the refrigerator may capture the printed expiration date of November 15 in a still image. On November 16, the user still may not have eaten the spinach. The set of still image cameras may sense through the image of the expiration date (e.g., November 15) that the spinach has expired the day before. The set of still image cameras may ascertain a nature of the freshness triggering event. The still image cameras may sense that the spinach has expired. The food freshness management action may include sending the user an alert to throw the expired spinach away and buy more. As another example, the user may consume the spinach before the expiration date. The set of still image cameras may sense through a captured still image that the bag of spinach is almost empty (e.g., ten spinach leaves left). The set of still image cameras may ascertain a nature of the freshness triggering event. The still image cameras may sense that the quantity of spinach in the refrigerator is low. The food freshness management action may include sending the user an alert to buy more spinach before they run out. Other methods of constructing and connecting a set of sensors and sensing the freshness triggering event for the food item may also be possible.

At block 320, a freshness triggering event may be identified for a food item. The freshness triggering event may be identified by the food freshness management engine of the food storage device. The freshness triggering event may indicate that a criterion related to the food item has been achieved. At block 340, a food freshness management action may be determined by the food freshness management engine of the food storage device. The food freshness management action may be determined to respond to the freshness triggering event for the food item. At block 360, the food freshness management action may be initiated by the food freshness management engine of the food storage device. The food freshness management action may utilize a sensory-oriented component of the food storage device. At block 380, the food freshness management action may be carried-out by the sensory-oriented component of the food storage device. The food freshness management action may be carried-out with respect to the freshness triggering event for the food item.

In embodiments, a visual indicator of a freshness factor of the food item may be provided at block 381. Generally, providing may include supplying, implementing, or otherwise producing a visual indicator of a freshness factor (e.g., expired, about to expire, the amount of time before expiration) of the food item. A visual indicator of a freshness factor may include a sensory alert provided by the food freshness management engine that may allow a user to determine the freshness factor of a food item using their sight. The visual indicator of a freshness factor of the food item may be provided by the sensory-oriented component of the food storage device, such as a light, a watch display, an LED display, a scrolling marquis, a clock, a scale, a graph, a thermometer, or other types of visual indicators of a freshness factor. The sensory-oriented component (e.g., a light) may allow the user to see the freshness factor of the food item when the food storage device is open or in use (e.g., when the user opens the door of the refrigerator). The visual indicator of a freshness factor of the food item may be provided to carry-out the food freshness management action. The visual indicator of the freshness factor of a food item may allow a user to quickly find a food item in the food storage device that has achieved a predetermined level of freshness. The visual indicator of the freshness factor of a food item may allow a user to determine which food items may be expired, about to expire, need to be replaced, or other freshness factors for which awareness may be beneficial.

In embodiments, configuration of the visual indicator may occur. Generally, configuring can include constructing, designing, arranging, or otherwise organizing the visual indicator. The configuration of the visual indicator may occur through the introduction of various types or kinds of visual alerts to the user to indicate a nature of a food item. In certain embodiments, the visual indicator may be configured to include a color at block 382. The visual indicator (e.g., light) may be configured to include various colors (e.g., red, orange, yellow, green, blue, indigo, violet, black, white). The color of the visual indicator may alert the user to a certain freshness factor of the food item (e.g., green indicates a food that has a high level of freshness, yellow indicates a food that will expire soon, red indicates a food that has expired, orange indicates a food that will need to be replaced soon due to low quantity). The configuration of the visual indicator to include a color may be a helpful visual indicator for users who want to quickly determine the nature of a food item.

In certain embodiments, the visual indicator may be configured to include a pattern at block 383. The visual indicator (e.g., light) may be configured to include various patterns (e.g., checked, concentric, dots, grid, herringbone, lattice, stripes, pinstripes, swirl, waffle, zigzag). The pattern of the visual indicator may alert the user to a certain freshness factor of the food item (e.g., dots indicate that a food is fresh, stripes indicate that a food has expired). The configuration of the visual indicator to include various patterns may be a helpful visual indicator for users who are colorblind. In certain embodiments, the visual indicator may be configured to include a texture at block 384. The visual indicator (e.g., screen) may be configured to include various textures (e.g., rough, smooth, ridges, gritty, soft, firm, sandy, coarse, sharp). The texture of the visual indicator may alert the user to a certain freshness factor of the food item (e.g., a rough screen indicates that a food has a low quantity and needs to be replaced, a screen with ridges indicates that a packaging of a food or drink is not completely sealed). The configuration of the visual indicator to include various textures may be a helpful sensory indicator for users who are blind.

Consider the following example. A user may be storing a loaf of bread on a shelf in their refrigerator for an upcoming dinner party. The loaf of bread may be beginning to mold after a long period of time in the refrigerator, so the user may not want to serve the loaf of bread at the dinner party. The set of sensors (e.g., video image cameras) in the refrigerator may record a video image of the mold growing on the bread. The food freshness management engine may determine that the user must be provided with a visual indicator of the freshness factor. The visual indicator of the freshness factor of the loaf of bread may indicate to the user that the bread is moldy and should not be served to guests. The visual indicator for the bread may be configured in various ways. The shelf on which the bread is stored may be a video image screen connected to the food freshness management engine. The shelf on which the bread is stored may change color to indicate to the user that the bread is moldy. For example, a green-colored shelf may indicate a fresh food item while a red-colored shelf may indicate a food that has expired. When the user next opens the refrigerator door, the shelf with the bread may have changed to red so the user knows the bread should not be served and needs to be replaced. The shelf on which the bread is stored may change pattern to indicate to the user, who may be color-blind, that the bread is moldy. For example, a pinstripe-patterned shelf may indicate to the user that a food is fresh, while a checker-patterned shelf may indicate to the user that a food has expired. When the user next opens the refrigerator door, the shelf with the bread may have changed from pinstripes to checks so the user knows the bread has expired. The shelf on which the bread is stored may change texture to indicate to the user, who may be blind, that the bread is moldy. For example, a smooth shelf may indicate a fresh food, while a bumpy shelf may indicate that a food has expired. When the user next opens the refrigerator door, the shelf with the bread may have changed from smooth to bumpy so the user knows that the bread should not be served to guests. Through various types or kinds of visual indicators, the user may be able to determine that the bread is moldy and should be thrown out and replaced. Other methods of providing a visual indicator of a freshness factor may also be possible.

In embodiments, an audio indicator of a freshness factor of the food item may be provided at block 385. Providing may include supplying, implementing, presenting, or otherwise producing an audio indicator of a freshness factor of the food item. An audio indicator of a freshness factor may include a sensory alert provided by the food freshness management engine that may allow a user to determine the freshness factor of a food item using their hearing. The audio indicator may include an audio message provided by the food storage device to the user (e.g., "the milk is about to expire", "buy more mayonnaise"), a noise created by a noisemaker of the food storage device (e.g., a beeping sound when a user does not completely close the jar of jam), or other types of audio indicators. The audio indicator of a freshness factor of a food item may be provided by the sensory-oriented component of the food storage device in response to opening the food storage device. The sensory-oriented component (e.g., the noisemaker) may allow the user to hear the freshness factor of a food item when the food storage device is open or in use (e.g., when the user opens the door of the freezer). The audio indicator of a freshness factor of the food item may be provided to carry-out the food freshness management action. The providing of an audio indicator of a freshness factor of a food item may be a helpful sensory indicator for users to quickly determine the nature of a food item (e.g., a food item that has expired, a food item that needs to be replaced).

Consider the following example. A user may store deli meat such as turkey for sandwiches in their refrigerator. The user may use a half-pound of turkey every week to make sandwiches to bring to work. The refrigerator may be configured to include a set of sensors, such as a scale to measure weight. On Sunday, the scale may measure only a quarter-pound of turkey, indicating that the user will not have enough turkey to make sandwiches for the workweek. The refrigerator may use an audio indicator to indicate to the user that they need to purchase more turkey. The audio indicator may be provided to the user when the user next opens the refrigerator door. The refrigerator may play a recorded message of "Buy more turkey today" when the user opens the refrigerator door. The refrigerator may also make a beeping sound when the door is opened to catch the attention of the user. The audio indicator may be provided to alert the user of a lower than desired quantity of turkey. Other methods of providing an audio indicator of a freshness factor of the food item may also be possible.

Method 300 concludes at block 399. Aspects may save resources such as bandwidth, disk, processing, or memory. As an example, aspects may save memory through the providing of visual and audio alerts instead of text message or email alerts. The user may be alerted to a freshness factor of a food item through a colored light or recorded message instead of an online message which may take up valuable memory on the mobile device of a user. Other methods of saving bandwidth using food freshness management may also be possible.

Figure 4:
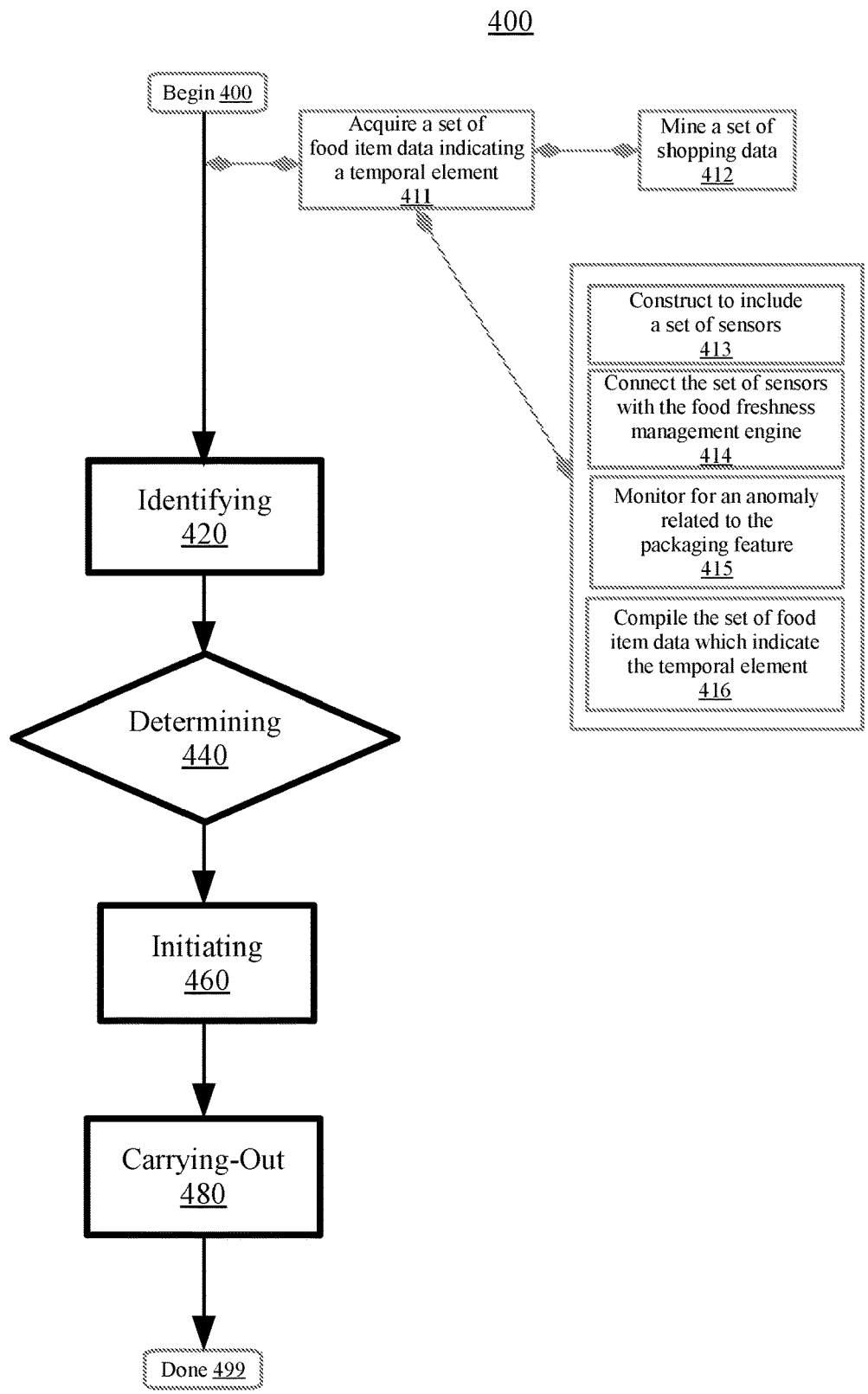
FIG. 4 is a flowchart illustrating a method of food freshness management using a food storage device which has a food freshness management engine, according to embodiments.

FIG. 4 is a flowchart illustrating a method 400 of food freshness management using a food storage device which has a food freshness management engine, according to embodiments. Aspects of method 400 may be similar or the same as aspects of method 200/300, and aspects may be utilized interchangeably with one or more methodologies described herein. The method 400 may begin at block 401.

In embodiments, a set of food item data for the food item may be acquired at block 411. Generally, acquiring may include obtaining, retrieving, pulling, collecting, gathering, subscribing, or otherwise capturing a set of food item data for the food item. The acquiring of a set of food item data for the food item may include an active action by the food storage device as opposed to passively receiving data (e.g., a pull operation, retrieving, using the set of sensors, using a list of user records). The set of food item data for the food item may be acquired by the food freshness management engine of the food storage device. The food freshness management engine of the food storage device may acquire the food item data using still image cameras or video image cameras, analyzing historical data of the user, scanning a barcode, or other methods. The food item data for the food item may include shopping data, frequency of use, optimal temperature of storage, optimal shelf life, or other types of food item data. The set of food item data may indicate a temporal element related to freshness of the food item. The temporal element related to freshness of the food item may include a set of data related to important or significant benchmark times with respect to the particular food item (e.g., date of preparation, purchase date, recommended use-by date, expiration date, likelihood of a reduced freshness timeframe due to compromised packaging, likelihood of a reduced freshness timeframe due to a container that was left open). Certain time periods (e.g., length of time the food item has been in the refrigerator) may be compared with the benchmark temporal periods to determine a food freshness management action (e.g., a bag of spinach normally lasts three days past the expiration date listed on the packaging). The set of food item data may assist the food freshness management engine in the identification of a freshness triggering event.

In embodiments, a set of shopping data may be mined at block 412. Mining may include collecting, obtaining, withdrawing, analyzing, or otherwise extracting a set of shopping data. The set of shopping data may be mined by the food freshness management engine of the food storage device. The set of shopping data may be analyzed by the food freshness management engine of the food storage device or by a third party (e.g., cloud service provider, manufacturer of the food storage device, developer of the food freshness management engine). The set of shopping data may be mined to acquire the set of food item data for the food item. The set of shopping data may be extracted from the historical data of a user or monitored by sensors and analyzed by the food freshness management engine or a third party in order to create a set of food item data for a food item (e.g., the user buys a gallon of milk every week, the user prefers to always have two quarts of ice cream in the freezer). The set of shopping data may include user shopping receipts (e.g., monitoring receipts from stores for frequently purchased items, examining receipts from stores in order to anticipate a shopping trip), redeemed coupon codes (e.g., discerning which food items a user buys only when they are on sale, ascertaining how often a user buys a certain food item with a coupon), credit card receipts (e.g., examining how often a user goes to the store), shopping lists (e.g., determining which food items a user plans on buying on their next trip to the store), purchased item lists (e.g., calculating how frequently a user buys a food item, determining how much of a food item a user just purchased), rewards card tracking information on a grocery store website (e.g., calculating the number of points a user needs until their next reward, tracking how often a user buys a food item with that rewards card), or other types of shopping data. The acquisition of the shopping data for a food item may allow the food freshness management engine to determine an appropriate food freshness management action (e.g., alert the user that the milk has expired, alert the user to buy more ice cream).

Consider the following example. A user may purchase a bag of shredded cheese and store it in their refrigerator. The refrigerator may be equipped with a set of sensors, including a barcode scanner. The scanner may scan the barcode on the bag of shredded cheese in order to acquire a set of food item data for the bag of shredded cheese. The barcode on the bag of shredded cheese may include a temporal element related to freshness of the food item. As an example, the barcode may indicate that the shredded cheese has a recommended use-by date of January 2. The food freshness management engine of the refrigerator may also mine a set of shopping data to acquire the set of food item data for the bag of shredded cheese. The set of shopping data related to the bag of shredded cheese may come from the shopping receipts or rewards card information of the user. The shopping receipts may indicate a purchase location or purchase date of the shredded cheese. The rewards card information may contain historical data related to how often the user purchases bags of shredded cheese. The purchase date, as well as frequency and location of purchase, may be added to the food item data of the shredded cheese. Other methods of acquiring a set of food data and mining a subsequent set of shopping data for a food item may also be possible.

In embodiments, the food storage device may be constructed to include a set of sensors at block 413 as described herein. In embodiments, the set of sensors may be connected with the food freshness management engine at block 414 as described herein. In embodiments, the food item may be monitored by the set of sensors at block 415. Monitoring may include observing, examining, censoring, detecting, or otherwise discerning the food item using the set of sensors. The food freshness management engine may use still image cameras, video image cameras, or other types of sensors to examine different food items (e.g., detect that a dish of guacamole is brown). The food item may be monitored for an anomaly related to the packaging feature. An anomaly can include an abnormality, deviation, inconsistency, or other irregularity related to the packaging feature of a food item. An anomaly related to the packaging feature may include a lid not fully closed (e.g., lid of a jar of pickles left slightly open), a cap left off (e.g., milk missing a cap because it was left on the counter), an opaque container that should be clear (e.g., half-eaten sandwich ingredients turn the plastic storage container gray instead of clear), a food item that has not been fully wrapped (e.g., the plastic wrapper surrounding the cheese has not been sealed), or other types of anomalies related to the packaging feature. The set of sensors may collect data related to abnormalities of packaging of food items to identify a freshness triggering event and determine a necessary food freshness management action (e.g., alerting the user to put the cap back on the milk).

In embodiments, the set of food item data may be compiled in response to observing the anomaly related to the packaging feature of the food item at block 416. Compiling can include assembling, computing, establishing, generating, consolidating, collecting, composing, or otherwise organizing the set of food item data in response to observing the anomaly related to the packaging feature of the food item. The set of food item data may be compiled by the set of sensors in order to determine the freshness factor of a food item. The set of food item data (e.g., length of time since the food item was properly sealed, typical shelf life of the food item) may be compiled by the set of sensors in order to determine a level of freshness and indicate a temporal element related to freshness of the food item. The set of sensors may compile the set of food item data through capturing still images or video images of a food item with an anomaly related to the packaging feature. The set of food item data may indicate the temporal element related to freshness of the food item. The set of food item data compiled may indicate a new length of time during which the food item is expected to remain fresh due to the anomaly related to the packaging feature (e.g., a sealed gallon of ice cream in the freezer may last two months versus an unsealed gallon of ice cream in the freezer that will only last two days, a dish of guacamole without a lid that is quickly turning brown versus a dish of guacamole with a lid that is expected to last a longer period of time).

Consider the following example. A family of four may use a refrigerator with a food freshness management engine. The family may use the refrigerator to store milk for their breakfast cereal. The refrigerator may be equipped with a video image camera, which may be connected with the food freshness management engine. One of the children in the family may be the last person to use the milk one morning, and may forget to put the cap back on before returning the milk to the refrigerator after breakfast. The video image camera may record a video image which indicates an anomaly related to the packaging (e.g., the cap is not on the gallon of milk). The refrigerator may also be equipped with a sensitive smell detection device. The smell detection device may detect an odor which indicates that the milk is beginning to expire at a faster than expected rate. The food freshness management engine of the refrigerator may compile the set of food item data for the milk which indicates the temporal element related to freshness of the food item. The milk may have been expected to expire in one week based on the expiration date indicated on the packaging. The food freshness management engine of the refrigerator may compile a set of food item data which indicates that the milk will actually expire before the one week is up, due to the cap being left off. The food freshness management engine of the refrigerator may use the set of food item data compiled to alert the user when the milk actually expires instead of when the milk may be expected to expire. Other methods of compiling the set of food item data in response to observing an anomaly related to the packaging feature may also be possible.

At block 420, a freshness triggering event may be identified for a food item. The freshness triggering event may be identified by the food freshness management engine of the food storage device. The freshness triggering event may indicate that a criterion related to the food item has been achieved. At block 440, a food freshness management action may be determined by the food freshness management engine of the food storage device. The food freshness management action may be determined to respond to the freshness triggering event for the food item. At block 460, the food freshness management action may be initiated by the food freshness management engine of the food storage device. The food freshness management action may utilize a sensory-oriented component of the food storage device. At block 480, the food freshness management action may be carried-out by the sensory-oriented component of the food storage device. The food freshness management action may be carried-out with respect to the freshness triggering event for the food item.

Method 400 concludes at block 499. Aspects may save resources such as bandwidth, disk, processing, or memory. As an example, aspects may provide the user with a more accurate or precise temporal element with respect to a food item expiration date as opposed to relying only on the expiration date provided by the producer on the packaging of the food item. This may allow for a more accurate set of food item data for the food item. Other methods of creating a more accurate set of food item data using food freshness management may also be possible.

Figure 5:
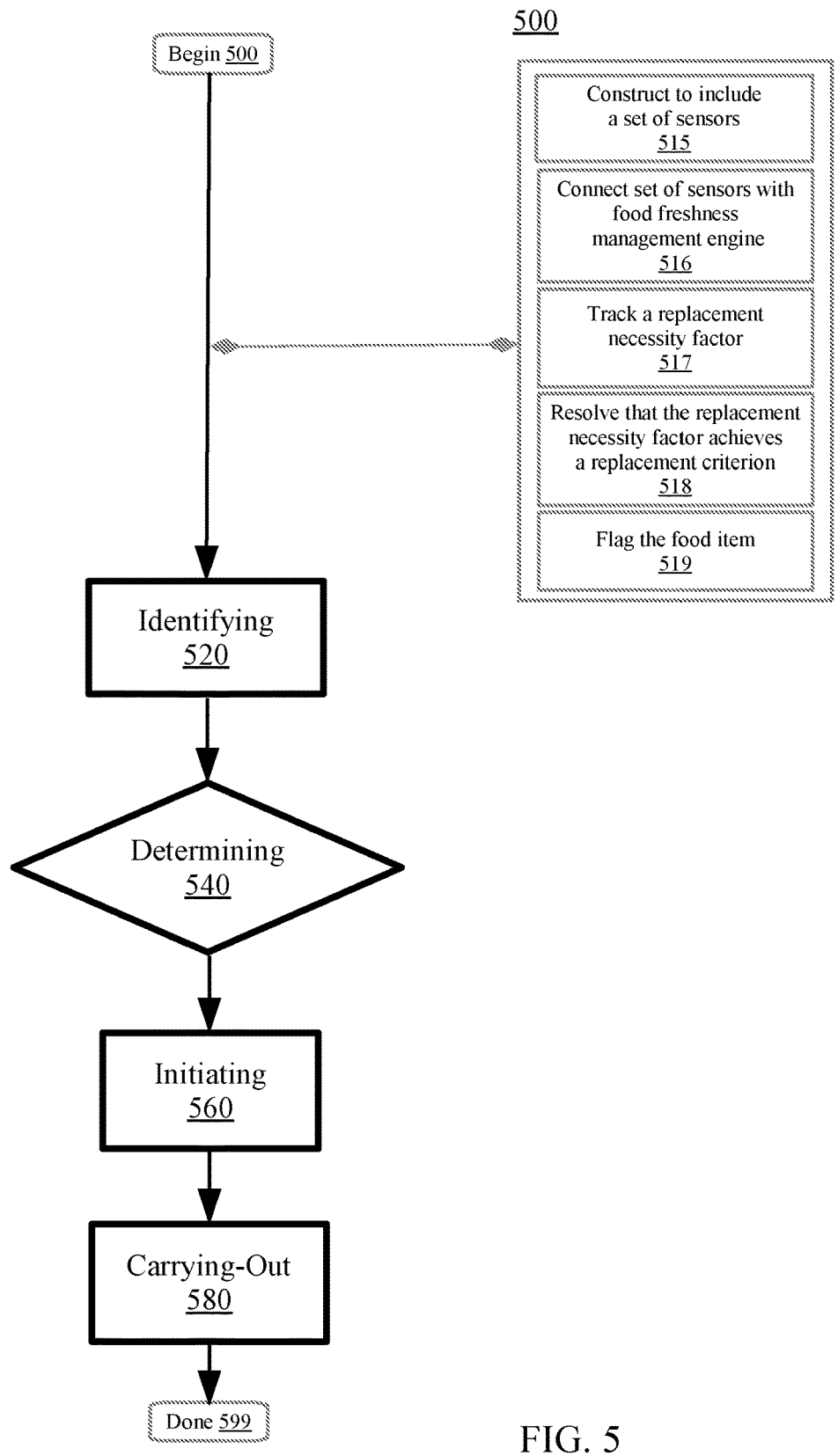
FIG. 5 is a flowchart illustrating a method of food freshness management using a food storage device which has a food freshness management engine, according to embodiments.

FIG. 5 is a flowchart illustrating a method 500 of food freshness management using a food storage device which has a food freshness management engine, according to embodiments. Aspects of method 500 may be similar or the same as aspects of method 200/300/400, and aspects may be utilized interchangeably with one or more methodologies described herein. The method 500 may begin at block 501.

In embodiments, the food storage device may be constructed to include a set of sensors at block 515 as described herein. In embodiments the set of sensors may be connected with the food freshness management engine at block 516 as described herein. In embodiments, a replacement necessity factor for the food item may be tracked at block 517. Generally, tracking can include monitoring, surveying, examining, or otherwise tracing a replacement necessity factor for the food item. The replacement necessity factor may be a value related to the need, desire, or requirement of a user to replace a particular food item. The replacement necessity factor may be based on the amount of a food item in storage (e.g., only one glass of milk remaining, three apples in the refrigerator), the consumption rate of a food item (e.g., a family of four drinks a gallon of orange juice every month, a user eats twice as much ice cream in the summer months), an expected expiration date of a food item (e.g., a bag of lettuce will expire on November 3, a jar of salsa is expected to expire by Friday), an expected date to need more of the food item (e.g., a user needs to buy more soda for a birthday party, a user will run out of butter by next shopping trip), an expected date to need a fresh food item (e.g., the user has crystallized ice cream and will need more by the weekend, the guacamole will turn brown by the time the user plans on eating it again), or other types of replacement necessity factors. The replacement necessity factor for the food item may be tracked by the food freshness management engine using the set of sensors. The set of sensors (e.g., still image camera, bar code scanner) may monitor (e.g., take photos, scan barcodes) the replacement necessity factor for the food item in order to alert the user through the food freshness management action that the food item needs to be replaced.

In embodiments, it may be resolved that the replacement necessity factor achieves a replacement criterion at block 518. Generally, resolving can include determining, computing, identifying, or otherwise calculating that the necessity factor achieves a replacement criterion. A replacement criterion may be a predetermined or benchmark value which indicates that a food item needs to be replaced. The replacement criterion may include a threshold temporal period, a projection of freshness level, a predetermined desired quantity of a food item, or other types of criterion (e.g., the milk is expected to expire within a threshold temporal period of ten days, the orange juice is expected to run out within the next two shopping trips, the user prefers to keep five cups of yogurt in the refrigerator between each shopping trip). The resolving may be based on the replacement necessity factor for the food item. The replacement criterion may be compared to the replacement necessity factor to establish whether or not the user needs to be alerted about a particular food freshness factor of a food item (e.g., the period of time the chicken has been in the refrigerator exceeds a temporal period of freshness of six days, the amount of bread in the refrigerator has fallen below a predetermined desired level of eight slices). The comparison of the replacement necessity factor and the replacement criterion may allow the food freshness management engine to determine a food freshness management action.

In embodiments, the food item may be flagged at block 519. Flagging may include marking or highlighting (e.g., adding to a shopping list). The flagging of the food item may better indicate to the user a freshness factor of a food item or whether the food item needs to be replaced. The achievement of a replacement criterion (e.g., temporal period of freshness, predetermined amount) may indicate that a food item may need to be replaced due to expiration (e.g., the milk will expire tomorrow and should be replaced), low quantity (e.g., there is only one slice of bread left in the freezer so the user cannot make a sandwich), or other food freshness factors. The food item may be flagged with respect to an anticipated shopping event. The food freshness management engine may add a food item to the shopping list of a user before an anticipated shopping event. The user may know in advance of the shopping trip that the food item needs to be replaced so they do not run out of this food item.

Consider the following example. A user may prefer to keep two packages of frozen corn in their freezer at all times. The freezer of the user may be constructed to include a set of sensors, such as still image cameras. The still image cameras may be connected with the food freshness management engine of the freezer. The food freshness management engine of the freezer may track a replacement necessity factor for the frozen corn. The replacement necessity factor may indicate that there is currently only one bag of frozen corn in the freezer. The replacement necessity factor may also indicate that the bag of frozen corn is expected to expire in two days. The food freshness management engine of the freezer may track this using still image cameras. The captured still image of the freezer may show only one bag of frozen corn. The captured still image for the bag of frozen corn may include an expiration date that is two days from now. The food freshness management engine of the freezer may resolve that the replacement necessity factor has achieved a replacement criterion. The replacement criterion for the bag of corn may include the information that the corn will expire within a threshold period of seven days (e.g., an expiration date in two days is sooner than an expiration date in seven days), the lower than desired quantity of corn in storage (e.g., the user prefers to keep two bags of frozen corn in the freezer and there is only one bag of frozen corn), or other food item data for the frozen corn. The food freshness management engine of the freezer may flag the frozen corn with respect to an anticipated shopping event. Based on the shopping data of the user, the food freshness management engine of the freezer may anticipate that the user will go to the store tomorrow. The food freshness management engine of the freezer may suggest that the user should buy frozen corn by adding it to their shopping list. Other methods of flagging a food item with respect to an anticipated shopping event may also be possible.

At block 520, a freshness triggering event may be identified for a food item. The freshness triggering event may be identified by the food freshness management engine of the food storage device. The freshness triggering event may indicate that a criterion related to the food item has been achieved. At block 540, a food freshness management action may be determined by the food freshness management engine of the food storage device. The food freshness management action may be determined to respond to the freshness triggering event for the food item. At block 560, the food freshness management action may be initiated by the food freshness management engine of the food storage device. The food freshness management action may utilize a sensory-oriented component of the food storage device. At block 580, the food freshness management action may be carried-out by the sensory-oriented component of the food storage device. The food freshness management action may be carried-out with respect to the freshness triggering event for the food item.

Method 500 concludes at block 599. Aspects may save resources such as bandwidth, disk, processing, or memory. As an example, aspects may save battery life of a mobile device by automatically adding a food item to a shopping list based on the replacement necessity factor. A user may automatically have the food item added to their shopping list when they need to buy more of the food item instead of draining battery on a mobile device due to a text message or email alert. Other methods of saving battery life of a mobile device using food freshness management may also be possible.

Figure 6:
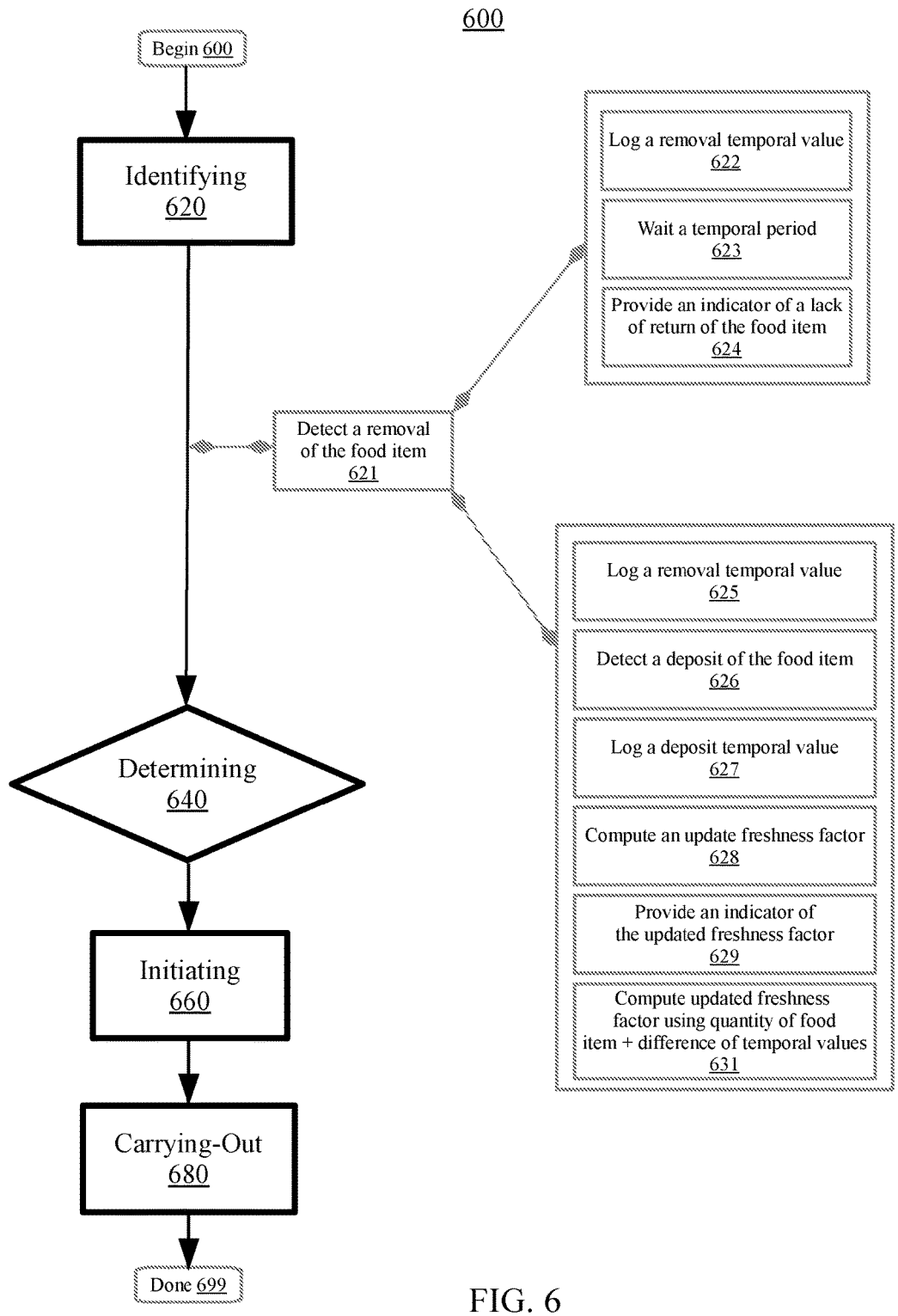
FIG. 6 is a flowchart illustration a method of food freshness management using a food storage device which has a food freshness management engine, according to embodiments.

FIG. 6 is a flowchart illustrating a method 600 of food freshness management using a food storage device which has a food freshness management engine, according to embodiments. Aspects of method 600 may be similar or the same as aspects of method 200/300/400/500, and aspects may be utilized interchangeably with one or more methodologies described herein. The method 600 may begin at block 601. At block 620, a freshness triggering event may be identified for a food item. The freshness triggering event may be identified by the food freshness management engine of the food storage device. The freshness triggering event may indicate that a criterion related to the food item has been achieved.

In embodiments, a removal of the food item may be detected at block 621. Generally, detecting can include sensing, observing, distinguishing, or otherwise identifying a removal of the food item. The removal of a food item may include a withdrawal or extraction of a food item from a food storage device (e.g., refrigerator, freezer). The removal of the food item may be detected by the food freshness management engine of the food storage device. The food freshness management engine may detect the removal of the food item using the set of sensors such as a video image camera (e.g., a video image of a user taking a stick of butter out of the refrigerator), a still image camera (e.g., comparison of an image of the freezer with a box of popsicles in the morning with an image of the freezer without a box of popsicles in the afternoon), a weight on a scale (e.g., the user has removed two pounds of apples from the second shelf), or other methods of using the set of sensors to detect the removal of the food item.

In embodiments, a removal temporal value may be logged with respect to the removal of the food item at block 622. Logging may include cataloging, storing, saving, recording, noting, or otherwise registering a removal temporal value with respect to the removal of the food item. The removal temporal value may be a recorded length of time since the food item was removed from the refrigerator. The removal temporal value may be logged based on an exact time (e.g., 10:16 A.M.), a stopwatch (e.g., two and a half hours), a timer (e.g., for thirty minutes), a countdown (e.g., ten seconds), or other methods of logging the removal temporal value. The removal temporal value may be logged in response to detecting the removal of the food item. The detection of the removal of the food item may indicate to the food freshness management engine to monitor a length of time for the achievement of a temporal period. The removal temporal value may be logged by the food freshness management engine of the food storage device. The food freshness management engine may monitor, record, or otherwise register different removal temporal values for different food items in order to optimize the freshness factor of a food item.

In embodiments, a temporal period may be waited at block 623. The temporal period may be configured or narrowly tailored to be specific for the food item (e.g., ice cream, whole milk, fish) or a type of food item (e.g., fruit, vegetable, dairy, meat). The temporal period may be a length of time (e.g., days, hours, seconds), a time of day (e.g., morning, afternoon, evening, night), or other temporal periods (e.g., an intervening event). As an example, a quart of ice cream may be removed from the freezer. The quart of ice cream may have a removal temporal value of five minutes before it begins to melt and the quality and freshness begin to decline. The food freshness management engine of the freezer may wait a temporal period of five minutes before alerting the user that the ice cream has been left out. Other examples of waiting a temporal period may also be possible.

In embodiments, an indicator of a lack of return of the food item may be provided at block 624. Providing may include presenting, displaying, transmitting, delivering, conveying, or otherwise supplying an indicator of a lack of return of the food item. The indicator of a lack of return of the food item may include an audio, visual, or other type of indicator to alert the user that a food item has not yet been returned to a food storage device (e.g., a threshold temporal period of ten minutes has passed since the mozzarella cheese has been removed from the refrigerator). An indicator of a lack of return of the food item may be provided by the sensory-oriented component of the food storage device (e.g., a light may flash red in the location in the refrigerator where the chicken is normally stored if the chicken has been removed from the refrigerator). The indicator of a lack of return of the food item may be provided in response to waiting the temporal period. The indicator of a lack of return of the food item may be provided after the achievement of a threshold temporal period since the removal temporal value (e.g., the freezer may wait a temporal period of ten minutes since the ice cream was removed before providing the user with the audio message "put the ice cream away"). The indicator of a lack of return of the food item may be provided to carry-out the food freshness management action. The indicator of a lack of return of the food item may be provided to the user in order to alert the user to put the food item back in the food storage device. The indicator of a lack of return of the food item may prevent a food item from expiring quickly.

Consider the following example. A user may store a gallon of ice cream in their freezer. The user may remove the gallon of ice cream from the freezer to serve dessert at a birthday party. The freezer may detect the removal of the gallon of ice cream through the set of sensors (e.g., a video image of the ice cream being taken out of the freezer). A removal temporal value may be logged for the gallon of ice cream, indicating the start of a period of time of removal. The freezer may log that the ice cream was removed from the freezer at 2:30 P.M. An established temporal period may be waited. Since ice cream melts quickly at room temperature, the temporal period configured for a gallon of ice cream may be relatively short (e.g., twenty minutes). The food freshness management engine may predict that after twenty minutes of removal, the freshness and quality of the gallon of ice cream may begin to decline. The user may be enjoying the birthday party and forget to return the gallon of ice cream to the freezer once everyone has been served. The food freshness management engine of the freezer may wait a temporal period of twenty minutes and detect that the ice cream still has not been returned to the freezer. The freezer may provide an indicator of a lack of return of the gallon of ice cream in order to preserve the freshness level of the ice cream. At 2:50 P.M., the freezer may make a beeping sound to alert the user to return the ice cream to the freezer. In this way, the food freshness management action for the ice cream may be carried-out. Other examples of providing an indicator of a lack of return of the food item may also be possible.

In embodiments, a removal temporal value may be logged with respect to the removal of the food item at block 625. The removal temporal value may be logged by the food freshness management engine of the food storage device. The removal temporal value may be logged in response to detecting the removal of the food item. In embodiments, a deposit of the food item may be detected at block 626. Detecting can include sensing, observing, distinguishing, or otherwise identifying a deposit of the food item. The deposit, storage, replacement, or stocking of a food item may be detected by the food freshness management engine of the food storage device. The deposit of a food item may be detected by the food freshness management engine through the use of sensors (e.g., video image camera, still image camera).

In embodiments, a deposit temporal value may be logged with respect to the deposit of the food item at block 627. Logging may include cataloging, storing, saving, recording, noting, or otherwise registering a removal temporal value with respect to the removal of the food item. The deposit temporal value may be a length of time during which or passed since the food item has been deposited in the food storage device. The deposit temporal value may be logged by the food freshness management engine of the food storage device. The deposit temporal value may be logged in response to detecting the deposit of the food item. The food freshness management engine may monitor, record, or otherwise register different deposit temporal values for different food items in order to optimize the freshness factor of a food item.

In embodiments, an updated freshness factor may be computed for the food item at block 628. Generally, computing can include calculating, determining, resolving, determining or otherwise analyzing an updated freshness factor for the food item. The updated freshness factor for the food item may be a different value of freshness for a particular food item (e.g., higher level of freshness, shorter period of shelf life, smaller amount of a food item). The updated freshness factor for the food item may be computed by the food freshness management engine. The updated freshness factor may be based on various features of a food item, such as the length of time an item was removed from the food storage device, the expected shelf life of the food item, the amount of time an item can be removed from the food storage device before a decline in freshness occurs, or other features of a food item. The updated freshness factor for the food item may be computed based on the removal and deposit temporal values. The food freshness management engine may compare the removal and deposit temporal values to determine an updated level of freshness for the food item.

In embodiments, an indicator of the updated freshness factor of the food item may be provided at block 629. Providing can include supplying, delivering, or otherwise producing an indicator of the updated freshness factor of the food item. The indicator of the updated freshness factor of the food item may be an audio alert (e.g., beeping noise), a visual alert (e.g., flashing light), or other type of indicator that may alert the user of the updated freshness factor of a food item. The indicator of the updated freshness factor of the food item may alert the user to a change in freshness or nature of a food item (e.g., less time until the food is expected to expire).

In embodiments, the updated freshness factor for the food item may be computed at block 631. Generally, computing may include calculating, determining, resolving, determining or otherwise analyzing the updated freshness factor for the food item. The updated freshness factor for the food item may be computed using a quantity of the food item (e.g., volume). The updated freshness factor for the food item may be computed using a difference of the deposit and removal temporal values (e.g., a food item was left out for a temporal period of thirty minutes, a food item was removed for a period of three hours and was deposited for a period of fifteen minutes). The updated freshness factor for the food item may also be computed using shape (e.g., shape of the container), temperature (e.g., room temperature of the kitchen, outdoor temperature), or other factors that may influence the freshness factor for the food item. In certain embodiments, computing the updated freshness factor for the food item may include calculating the difference between the deposit and removal temporal values (e.g., a difference of thirty minutes between the time the item was removed from the refrigerator and the time the item was returned to the refrigerator), analyzing the relationship between the shape of the container and the temperature of the room (e.g., a linear relationship, an exponential relationship, a logarithmic relationship), examining the quantity of the food item with respect to the removal temporal value (e.g., positive correlation, negative correlation), or other methods of computing with respect to the updated freshness factor for the food item.

Consider the following example. A user may want to serve guacamole as an appetizer for a dinner party. The user may be storing the guacamole in a cooler on their back porch in anticipation of the arrival of their guests. The cooler may be equipped with a set of sensors, including still image cameras. The guests of the user may arrive ninety minutes before dinner, and the guacamole may be removed from the cooler at this time. The still image cameras may detect a removal of the guacamole through a captured still image. A removal temporal value may be logged for the guacamole. A timer may begin when the guacamole is removed ninety minutes before dinner. The timer may be counting down from one hundred minutes, the established temporal period during which a dish of guacamole can be removed before losing its freshness. The user may deposit the guacamole back in the cooler at the beginning of dinner (e.g., after ninety minutes). The still image cameras of the cooler may detect the deposit of the guacamole through another captured still image. The timer for the guacamole may be turned off after the detection of the deposit of the guacamole. The food freshness management engine of the cooler may log a deposit temporal value for the guacamole. The deposit temporal value may be logged to indicate that the guacamole was deposited in the cooler ten minutes before the removal temporal period expired. An updated freshness factor for the guacamole may be computed based on the removal and deposit temporal values. The guacamole may have lost most of its freshness after sitting on the back porch for ninety minutes. The guacamole may not have lost all of its freshness since it was returned to the cooler before one hundred minutes. The difference between the deposit and removal temporal values (e.g., ten minutes versus ninety minutes) may be helpful in computing the updated freshness factor for the guacamole. The quantity of the food may also be used as a factor to compute the updated freshness factor. As an example, the guests may have eaten half the volume of the guacamole, indicating that the user may want to buy more. An indicator of the updated freshness factor (e.g., half quantity, lost freshness) of the guacamole may be provided to the user. The cooler may have a light that shines purple when the food inside is fresh and a light that shines orange when the food is not fresh or needs to be replaced. When the user next opens the cooler, the light may be orange to indicate that the user needs to buy more guacamole. Other methods of providing an indicator of the updated freshness factor based on temporal values may also be possible.

At block 640, a food freshness management action may be determined by the food freshness management engine of the food storage device. The food freshness management action may be determined to respond to the freshness triggering event for the food item. At block 660, the food freshness management action may be initiated by the food freshness management engine of the food storage device. The food freshness management action may utilize a sensory-oriented component of the food storage device. At block 680, the food freshness management action may be carried-out by the sensory-oriented component of the food storage device. The food freshness management action may be carried-out with respect to the freshness triggering event for the food item.

Method 600 concludes at block 699. Aspects of method 600 may provide performance or efficiency benefits. Aspects may save resources such as bandwidth, disk, processing, or memory. As an example, aspects may save processing time. The food freshness management engine may dynamically calculate an updated freshness factor for a food item while a food item is being consumed. For example, an updated freshness factor for an ice cream cake may be calculated based on the room temperature, the period of time during which the cake has been removed from the freezer, and the amount of cake that the guests consume, all while the user is serving the cake to their guests. Other methods of saving processing time may also be possible.

Consider the following example. A user may be storing three gallons of ice cream in their freezer for an upcoming Fourth of July party on Friday. The freezer may include a set of still image cameras and a barcode scanner, and these sensors may be connected with a food freshness management engine. The cameras and barcode scanner may be constructed to sense various freshness triggering events of food items (e.g., three gallons of ice cream). The still image cameras in the freezer may identify an expiration date on the packaging of the gallons of ice cream (e.g., July 1). The expiration date of the ice cream may be earlier than the date of the party (e.g., three days earlier). The food freshness management engine of the freezer may determine a food freshness management action in order to alert the user that their ice cream is going to expire before the party. The food freshness management action may send a command to a sensory-oriented component in the freezer (e.g., a light on the shelf where the ice cream is stored). The command sent to the light on the shelf may include changing the color of the light. The shelf may appear green when the food stored on it is fresh. The shelf may change to red to indicate that the food stored on it is not fresh and needs to be replaced. The food freshness management engine may carry-out the food freshness management action by changing the color of the shelf where the ice cream is stored from green to red. In this way, the user may be able to identify at a glance that their ice cream should not be eaten and should be replaced before the party.

One of the gallons of ice cream may be chocolate ice cream. A set of food item data for the chocolate ice cream may be acquired by the food freshness management engine of the freezer, including a temporal element related to freshness of the chocolate ice cream. The barcode scanner in the freezer may scan the barcode of the chocolate ice cream. The information on the barcode of the chocolate ice cream may include an expiration date of July 1. A set of shopping data may also be mined by the food freshness management engine of the freezer to acquire the set of food item data for the chocolate ice cream. The set of shopping data mined from shopping receipts and credit card data may indicate that the user goes to the grocery store every Thursday. The user may eat a bowl of chocolate ice cream on the Tuesday before the party and return the gallon of ice cream to the freezer without completely sealing the lid. The still image cameras in the freezer may detect that the lid is not completely sealed. The set of food item data for the chocolate ice cream may be compiled using the temporal element related to freshness of the food item. The chocolate ice cream may not stay fresh as long as the packaging indicates now that the lid has not been sealed. The package may have indicated that the chocolate ice cream would expire on July 1, but without the lid sealed, the food freshness management engine may determine that the chocolate ice cream will actually expire on June 26. The food freshness management engine of the freezer may carry-out a food freshness management action which includes changing the color of the shelf containing the chocolate ice cream from green to red to indicate to the user to seal the lid of the chocolate ice cream the next time they open the freezer door.

The second gallon of ice cream in the freezer may be strawberry. The barcode scanner in the freezer may scan the barcode of the strawberry ice cream which indicates an expiration date of July 1. The strawberry ice cream may have a replacement necessity factor based on expiration date. It may be resolved that the replacement necessity factor for the strawberry ice cream achieves a replacement criterion. The food freshness management engine of the freezer may be configured such that an indication to replace the strawberry ice cream may occur whenever the strawberry ice cream expires. On July 2, the strawberry ice cream may reach its expiration date, thus achieving the replacement criterion. The strawberry ice cream may automatically be added to the shopping list of the user. The shopping data of the user indicates an anticipated shopping trip on Thursday. The user may be able to replace the strawberry ice cream before the party on Friday.

The third gallon of ice cream may be vanilla ice cream. The user may decide to eat a bowl of vanilla ice cream on Tuesday. The cameras in the freezer may detect a removal of the vanilla ice cream at 8:03 P.M. The food freshness management engine of the freezer may indicate a removal temporal period of only thirty minutes for vanilla ice cream before the freshness is expected to decline. At 8:33 P.M., the user may not yet have returned the vanilla ice cream to the freezer, and the food freshness management engine may provide an indicator of a lack of return of the vanilla ice cream. The indicator of the lack of return of the vanilla ice cream may include a beeping sound when the user next opens the freezer. When the user returns the vanilla ice cream to the freezer at 8:41 P.M., the food freshness management engine may detect this deposit. The food freshness management engine of the freezer may compute an updated freshness factor for the food item. As an example, the thirty-eight minutes outside of the freezer may have caused the vanilla ice cream to melt and lose freshness. The food freshness management engine may provide an indicator of the updated freshness factor. The shelf where the vanilla ice cream is stored may change from green to red to indicate to the user to replace the vanilla ice cream. Other methods of food freshness management using a food storage device which has a food freshness management engine may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of food freshness management using a food storage device, the method comprising:
    detecting that a food item has been placed in a food storage device;
    scanning a barcode printed on the food item;
    acquiring an expiration date of the food item by referencing information associated with the barcode;
    detecting removal of the food item from the food storage device based on a comparing a weight on a shelf within the food storage device;
    detecting addition of the food item to the food storage device based on comparing still images of the shelf within the food storage device;
    determining a freshness factor of the food item based on an odor of the food item;
    determining whether the food item will spoil on a date prior to the expiration date based on the freshness factor;
    based on determining that the food item will spoil on the date prior to the expiration date, indicating that the food item will expire on the date prior to the expiration date via a light emitting diode screen;
    adding the food item to a shopping list; and
    based on determining that the food item is in the food storage device post the date prior to the expiration date, activating a light in proximity to the food item.

* * * * *